United States Patent
Jiang et al.

(10) Patent No.: US 8,522,242 B2
(45) Date of Patent: Aug. 27, 2013

(54) CONDITIONAL BATCH BUFFER EXECUTION

(75) Inventors: Hong Jiang, El Dorado Hills, CA (US); Wishwesh Gandhi, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1175 days.

(21) Appl. No.: 12/006,243

(22) Filed: Dec. 31, 2007

(65) Prior Publication Data

US 2009/0172676 A1    Jul. 2, 2009

(51) Int. Cl.
*G06F 9/46* (2006.01)

(52) U.S. Cl.
USPC .............................. 718/101; 718/102; 718/106

(58) Field of Classification Search
None
See application file for complete search history.

(56) References Cited

U.S. PATENT DOCUMENTS

| | | | | |
|---|---|---|---|---|
| 4,642,763 | A | * | 2/1987 | Cummins ...................... 718/101 |
| 5,379,412 | A | * | 1/1995 | Eastridge et al. ............. 711/162 |
| 5,657,478 | A | * | 8/1997 | Recker et al. ................. 345/503 |
| 5,881,283 | A | * | 3/1999 | Hondou et al. ................ 718/100 |
| 6,640,244 | B1 | * | 10/2003 | Bowman-Amuah .......... 709/207 |
| 6,795,080 | B2 | * | 9/2004 | Lavelle et al. ................ 345/552 |
| 6,971,084 | B2 | * | 11/2005 | Grey et al. .................... 717/106 |
| 6,995,773 | B2 | * | 2/2006 | Doyle et al. .................. 345/559 |
| 7,010,364 | B1 | * | 3/2006 | Singh et al. ..................... 700/51 |
| 7,012,604 | B1 | * | 3/2006 | Christie et al. ............... 345/426 |
| 2002/0124042 | A1 | * | 9/2002 | Melamed et al. ............. 709/102 |
| 2002/0166117 | A1 | * | 11/2002 | Abrams et al. ................ 717/177 |
| 2002/0172107 | A1 | * | 11/2002 | Yamada et al. ............ 369/30.26 |
| 2005/0097564 | A1 | * | 5/2005 | Laura ............................ 719/312 |
| 2005/0198636 | A1 | * | 9/2005 | Barsness et al. ............. 718/100 |
| 2009/0024997 | A1 | * | 1/2009 | Kobayashi .................... 718/101 |

* cited by examiner

*Primary Examiner* — Emerson Puente
*Assistant Examiner* — Jonathan R Labud
(74) *Attorney, Agent, or Firm* — Trop, Pruner & Hu, P.C.

(57) ABSTRACT

A batch computer or batch processor may implement conditional execution at the command level of the batch processor or higher. Conditional execution may involve execution of one batch buffer depending on the results achieved upon execution by another batch buffer.

5 Claims, 2 Drawing Sheets

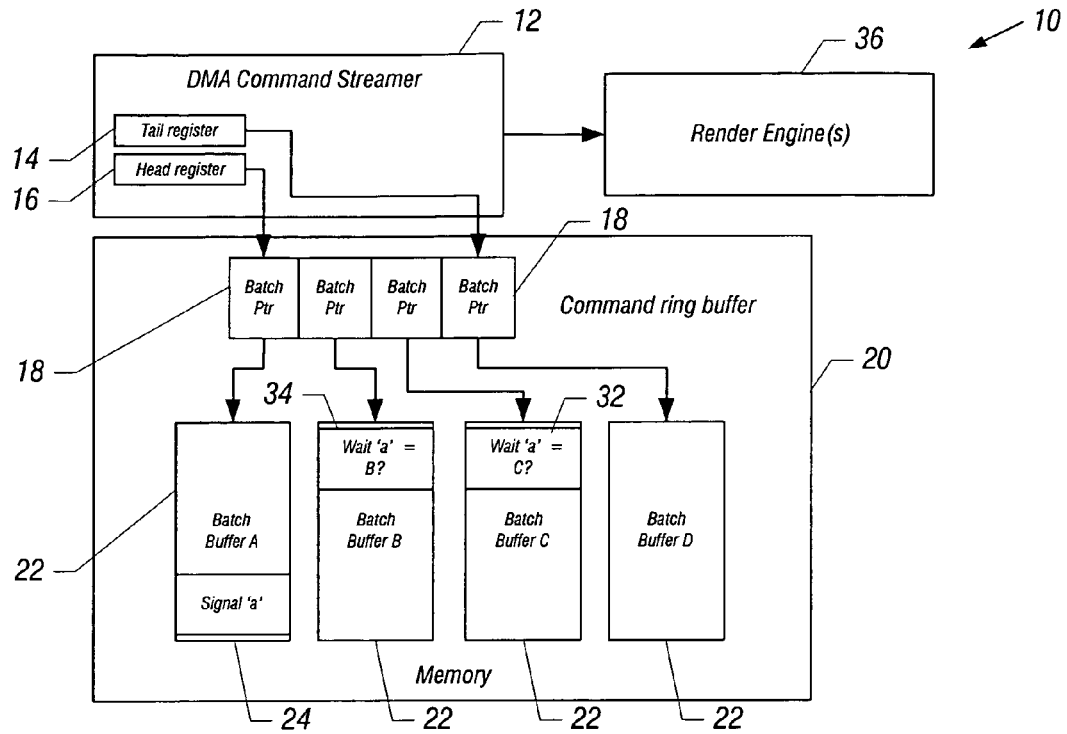
FIG. 1
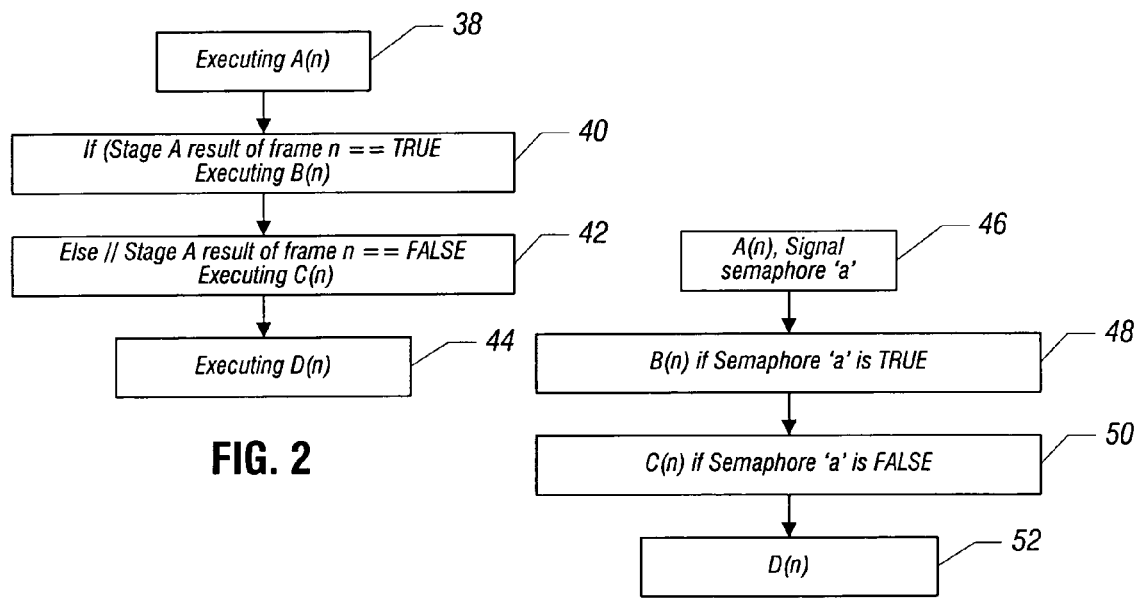
FIG. 2
FIG. 3

CONDITIONAL BATCH BUFFER EXECUTION

BACKGROUND

This relates generally to batch computing.

In batch computing or batch processing, a group of transactions are processed collectively as a unit at one time. The transactions are collected and processed against master files. Batch computing is used in a number of central processing units and also is extremely common in graphics engines. Batch computing may enable a number of tasks to be spread among various graphics engines and processed in parallel.

BRIEF DESCRIPTION OF THE DRAWINGS

FIG. 1 is a schematic depiction of one embodiment of the present invention;

FIG. 2 is a flow chart for one embodiment of the present invention;

FIG. 3 is a flow chart for one embodiment of the present invention;

DETAILED DESCRIPTION

Figure 4:
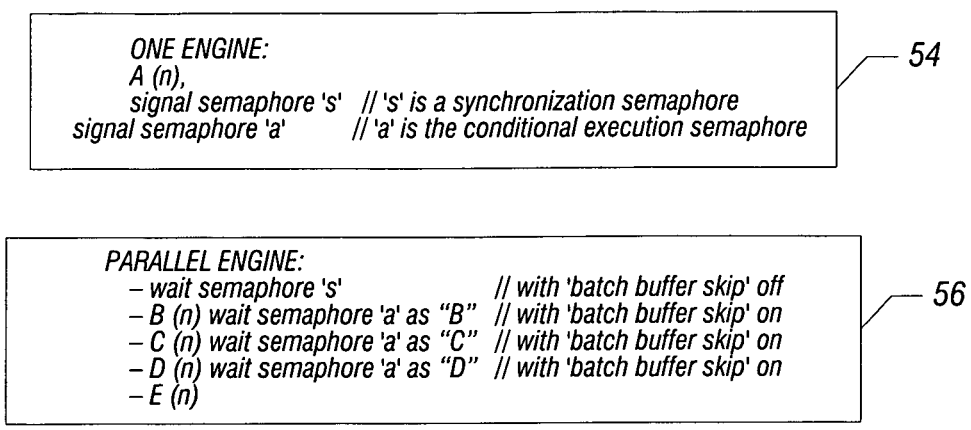
FIG. 4 is a flow chart for one embodiment of the present invention.

In batch computing environments, the batch runs generally in isolation from other operations in the computing environment. For example, in graphics processors or graphics engines, batch buffers are used to handle complex transactions. Generally, there is no way to intervene within the processing within the batch buffer.

In accordance with some embodiments of the present invention, dynamic or conditional execution may be achieved at the command or higher level of a batch buffer processing operation. The issue with dynamic or conditional execution arises because in a first stage, a result may occur and, based on the result that occurs, it may be desirable to proceed to process one batch or, if the result does not occur, to process another batch and then to go on and process a third batch. Because of the isolation of each batch processing, conditional execution is not achieved.

Referring to FIG. 1, a batch processing apparatus 10 may be a graphics processor or graphics engine in accordance with one embodiment of the present invention. It includes a direct memory access command streamer 12 in one embodiment. However, other controllers that issue batch buffer commands or higher level instructions 40 may be used. The streamer 12 is basically a controller or command engine for the overall batch processing apparatus 10. It may include a tail register 14 that points to a tail entry of the Command Ring Buffer 18 and a head register 16 that points to a head entry of the Command Ring Buffer 18. The command ring buffer may contain a polarity of commands, including Batch Buffer Pointer command. Each batch pointer may be directed to one of a plurality of batch buffers 22. Each batch buffer may store a batch program which may be executable in parallel or under command from the command streamer 12. The command streamer 12 may also communicate with a graphics render engine 36 in some embodiments. The render engine 36 may, for example, be coupled to a display. In some cases, a plurality of engines 36 may be used.

Conditional execution may be implemented at the batch buffer command level (or higher) in hardware. The conditional execution may be handled by the command streamer 12 in one embodiment. Driver software may set up the batch buffer commands in order, with conventional execution marked within the individual buffers.

For example, in the embodiment shown in FIG. 1, four batch buffers 22 are provided. As one example, conditional execution may call for execution of batch buffer A, followed by execution of batch buffer B, conditioned on what happens in the execution of batch buffer A, followed by the execution of batch buffer C, conditioned on what happened in the execution of batch buffer A, followed by execution of the batch buffer D.

With hardware support for conditional batch buffer execution, this sequence of batch buffer commands may be executed by command streamer 12. Initially, the code in buffer A is executed, as indicated in block 38. If the result of the execution of stage A and batch buffer A for a frame n is TRUE, then batch buffer B is executed, as indicated in block 40 in FIG. 2. Otherwise, if the result of stage A is not TRUE, then the batch buffer C is executed, as indicated in block 42. Thereafter, batch buffer D may be executed, as indicated in block 44.

Thus, a conditional execution may be set up which is executed by the command streamer 12 at the batch buffer command level.

Without direct memory access command level (or higher) conditionals, less efficient solutions must be used, such as frame delay decisions, redundant computation, or shader/kernel level branching. Even though kernel level branching may perform such conditional execution, it suffers from performance penalties because branch overhead applies to both pass and fail conditions in the program and thread generation hardware throughput may be limiting for the failure case.

As another embodiment, conditional execution may be implemented using hardware semaphore mechanisms above the direct memory access command level. A hardware semaphore mechanism allows hardware to reject the batch buffer execution and return the context of the batch buffer back to a scheduler which may be part of an operating system. Thus, the semaphore is executed above the batch buffer command level, as part of the operating system of a host computer. The semaphore mechanism may also be utilized to synchronize multiple parallel engines. If a semaphore condition is false, instead of rejecting the batch buffer, the hardware may simply skip the batch buffer as a whole. In other words, the batch buffer is deemed completed. Such behavior may be transparent to the scheduler.

The following pseudo code may be utilized. As indicated in FIG. 1, there is a code 24 for a signal 'a' in batch buffer A and there is a code 34 wait 'a' equal B? 34 in batch buffer B and a similar code 32 wait 'a' equal C? in batch buffer C. As indicated in FIG. 3, a semaphore 'a' is signaled as a result of batch buffer A execution. The semaphore signal 'a' 24, shown in FIG. 1, is signaled based on the results of the batch buffer A execution, as indicated in block 46 of FIG. 3. In block 48, batch buffer B is executed if the semaphore signal 'a' is TRUE. Alternatively, batch buffer C may be executed, if the scheduler determines that the semaphore 'a' is FALSE, as indicated in block 50. Then, in this example, batch buffer D is executed, as indicated in block 52. Thus, the batch buffers B and C have a wait command 34 or 32 which causes the batch buffer to wait for the semaphore 'a' based on the result of the execution of batch buffer A and the signal 'a' to the scheduler.

Figure 6:
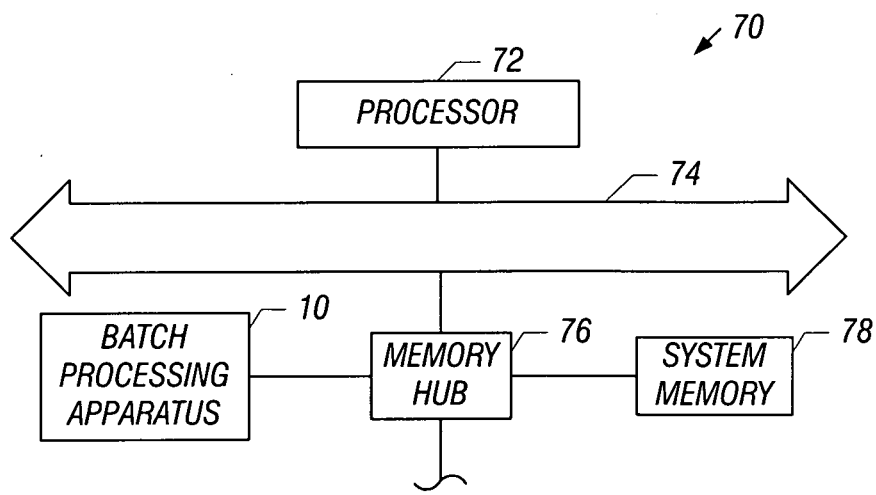
FIG. 6 is a system depiction for one embodiment.

Referring to FIG. 6, a host computer system 70 may include the batch processing apparatus 10. In one embodiment, the batch processing apparatus 10 is part of a graphics engine. The batch processing apparatus 10 may be coupled to a memory hub 76 in accordance with one architecture. However, other architectures may be used as well. The memory hub 76 also couples to a system memory 78 which may store the operating system including the scheduler. The memory hub 76 is coupled by a system bus 74 to a processor 72 in one embodiment.

The decision 'a' does not have to be binary. If it is not a binary decision, a switch case type of conditional execution may be supported as:

A(n), signal semaphore 'a'
B(n) wait semaphore 'a' as "B"
C(n) wait semaphore 'a' as "C"
D(n) wait semaphore 'a' as "D"
E(n).

The semaphore signal is by the same engine and not for a parallel engine in some cases. It may be supported to signal the conditional batch buffer execution semaphore from different engines as well. This may be accomplished by using two semaphores, one from between engine synchronization and the other for conditional execution.

Referring to FIG. 4, at block 54, one engine may set the batch buffer A signal semaphore 's' as a synchronization semaphore and the semaphore 'a' as a conditional execution semaphore. Then, in the parallel engine code 56, there is a wait for the synchronization semaphore. In batch buffer B there is a wait for the conditional execution semaphore, such that buffer B is only executed if the conditional execution semaphore 'a' signals as "B". Otherwise, batch buffer C may be scheduled if the conditional execution semaphore 'a' signals as "C". Likewise, batch buffer D may be scheduled if the conditional execution semaphore 'a' signals as "D". And then batch buffer E is scheduled.

In another embodiment, using a software intervention model, host computer 70 software may intercept a decision result from a detection stage and configure a processing stage on the fly. In the operation pipe, this may be configured by driver software and performed by hardware in a batch compute mode.

The driver software is not available to intercept the decision in the detection stage and reconfigure the commands to select an option. So one or more frame delays are introduced between the detection stage and the processing stages.

This frame delay may be handled in the following way. When applying a decision from one frame to the succeeding frame, the decision is correct due to the continuity of the data, such as video data. It is still desirable from a throughput and bandwidth point of view to apply the delayed decision. However, when a mismatch does occur and is detected, a conditional patch may be employed. The compute and bandwidth impact of such a conditional patch may be minimal as long as a patch occurs rarely.

Figure 5:
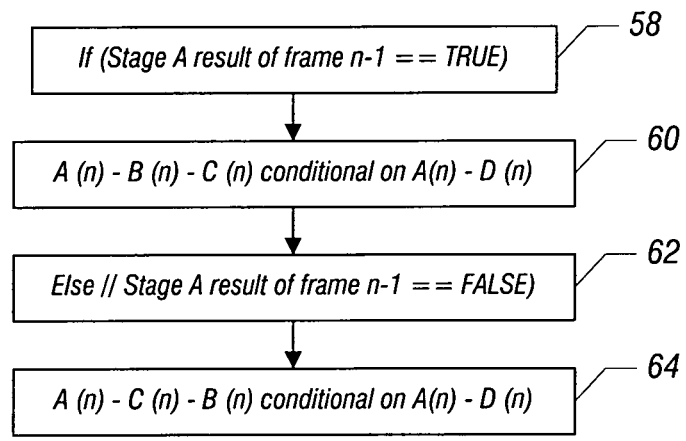
FIG. 5 is a flow chart for one embodiment of the present invention.

Thus, referring to FIG. 5, a check at block 58 determines if the result of the detection stage A of frame n-1 is true. If so, the flow goes to batch buffer B, conditioned on the result of stage A and then stage D. Otherwise, the flow goes to stage C, instead of stage B, and then on to stage D, as indicated in block 64.

One conditional stage is added to the sequence of the batch buffer commands in the code shown in FIG. 5. If stage A(n) determines that the decision from frame (n-1) is incorrect, a conditional stage C or B is turned on to overwrite the processing results from the previous unconditional processing stage B or C, respectively.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A batch processor comprising:
a controller;
a command ring buffer, coupled to the controller, including a plurality of batch buffers, each storing a batch program for execution;
the controller to provide a sequence of execution of the batch programs at or above the batch buffer level;
based on the results of execution of one of the batch programs, change the sequence of batch program execution;
wherein the batch processor is a graphics engine;
wherein at least one of the batch programs indicates what to do upon the occurrence of a condition; and
wherein the sequence of execution of the batch programs is provided in response to a semaphore which signals the result of one of the batch programs executed in one batch buffer to another batch buffer.

2. The batch processor of claim 1 wherein the controller is a direct memory access command streamer.

3. The batch processor of claim 2, the streamer to implement the sequence of execution of the batch programs at the command level of said command streamer.

4. The batch processor of claim 1 including two batch processing engines that communicate using semaphore.

5. The batch processor of claim 1 including a device to overwrite the results of a sequence of executions of the batch programs if the sequence turns out to be incorrect based on a condition that is detected upon execution by one batch program.

* * * * *